July 12, 1960
J. C. ELMS ET AL
2,944,736
AIR DENSITY COMPUTER
Filed Oct. 12, 1953
2 Sheets-Sheet 1
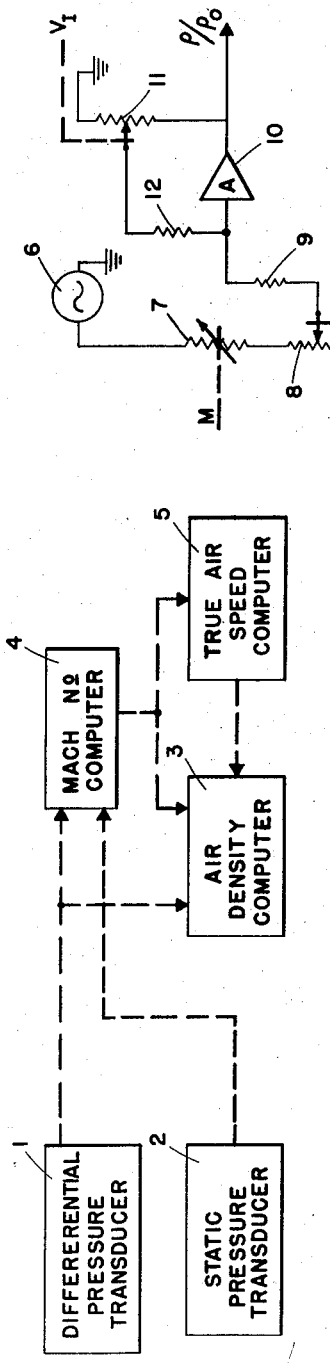
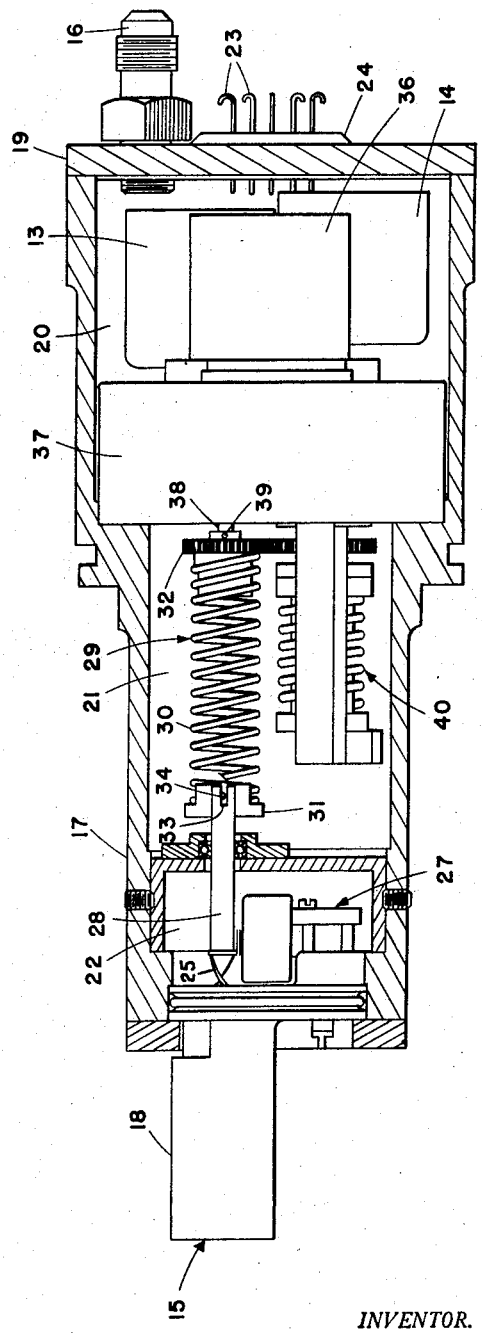
INVENTOR.
JAMES C. ELMS
FREDERICK H. GARDNER
BY *William L. Lane*
ATTORNEY July 12, 1960

J. C. ELMS ET AL 2,944,736

AIR DENSITY COMPUTER

Filed Oct. 12, 1953

INVENTOR.
JAMES C. ELMS
FREDERICK H. GARDNER
BY *William R. Lane*

ATTORNEY

United States Patent Office 2,944,736
Patented July 12, 1960

2,944,736
AIR DENSITY COMPUTER

James C. Elms, Newport Beach, and Frederick H. Gardner, Long Beach, Calif., assignors to North American Aviation, Inc.

Filed Oct. 12, 1953, Ser. No. 385,364

7 Claims. (Cl. 235—151)

This invention pertains to means for producing a voltage proportional to the ratio of the air density surrounding a moving vehicle to a standard air density, and more particularly to means for obtaining a voltage proportional to the ratio of the air density surrounding a moving aircraft at any altitude to a standard density of air at sea level.

It is necessary for the proper operation of fire control autopilots to provide a voltage which is proportional to the air density surrounding a moving aircraft with respect to a standard air density, which is usually taken to be the density measured at lea level. The air density must be computed from information which is available upon a moving craft. Available upon a moving aircraft for making this computation are ram pressure, static-pressure, and stagnation temperature. These parameters are in turn used to compute Mach number and true-velocity. This invention contemplates a device for making this computation with the accuracy required for the prediction of the flight path of rockets launched from the moving aircraft and for controlling the sensitivity of servo systems connected to operate the control surfaces of said craft. The computer of this invention is set forth in the specification of application Serial No. 371,756, filed August 3, 1953, for "Integrated Aircraft Fire Control Autopilot" by John R. Moore and David G. Soergel.

It is therefore an object of this invention to provide an improved air density computer.

It is another object of this invention to provide means for producing an electrical signal proportional to the density of air surrounding a moving vehicle.

It is another object of this invention to provide means for producing an electrical signal proportional to the ratio of the air density surrounding a moving vehicle to a standard density of air at sea level.

It is still another object of this invention to provide means for creating a voltage proportional to the ratio of the air density surrounding a moving vehicle to a standard air density.

It is yet another object of this invention to provide means for producing a voltage proportional to the ratio of the air density surrounding an aircraft at any altitude to a standard density of air at sea level.

Other objects of invention will become apparent from the following description taken in connection with the accompanying drawings, in which Fig. 1 is a block diagram which shows how the input parameters of the device of this invention are obtained;

Fig. 2 is a schematic diagram of the device of this invention;

Fig. 3 is a view partly in section of a typical transducer which may be used to generate a shaft rotation proportional to static pressure or proportional to the difference between ram and static pressure;

Figure 6:
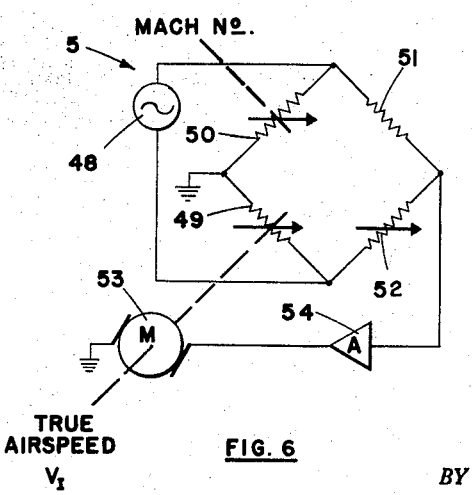

And Fig. 6 is a schematic drawing of a typical true air speed computer.

In Fig. 1, differential pressure transducer 1 generates a shaft rotation proportional to the difference between ram and static pressure measured upon a moving vehicle. Pressure transducer 2 generates a shaft rotation proportional to the static pressure measured upon the moving vehicle. The output of differential pressure transducer 1 is connected to the input of air density computer 3 and Mach number computer 4. The output of static pressure transducer 2 is connected to the input of Mach number computer 4. The output of static pressure transducer 2 is connected to the input of Mach number computer 4. The output of Mach number computer 4 is a shaft rotation proportional to the Mach number of the vehicle. The output of Mach number computer 4 is connected to the input of air density computer 3 and true air speed computer 5. True air speed computer 5 produces a shaft rotation which is proportional to the true air speed of the vehicle upon which it is mounted and is connected to the input of air density computer 3.

In Fig. 2 voltage source 6 is connected across resistors 7 and 8 in series. Resistor 8 is connected as a linear potentiometer. Resistor 7 is connected as a variable resistor which has its resistance distributed so that the total resistance measured across its terminals is always proportional to a predetermined function of it shaft rotation. This function is $$R = 1 + \frac{B^2}{4} + \frac{B^4}{40} + \frac{B^6}{1600} + \cdots$$

wherein B is the shaft rotation.

The shaft of resistor 7 is mechanically connected to be driven by Mach number computer 4. The shaft of potentiometer 8 is mechanically conencted to be driven by differential pressure transducer 1. The movable arm of potentiometer 8 is electrically connected through summing resistor 9 to the input of amplifier 10. Potentiometer 11 is connected across the output of amplifier 10. Potentiometer 11 is a potentiometer whose resistance is distributed so that the resistance between one fixed and the movable terminal is proportional to the square of the rotation of its shaft. The shaft of potentiometer 11 is mechanically connected to the output of true air speed computer 5. The movable arm of potentiometer 11 is electrically connected through summing resistor 12 to the input of amplifier 10 to provide a feedback loop about amplifier 10. The total resistance across the terminals of resistor 7 is very much larger, preferably of the order of ten times, than the total resistance across the fixed terminals of potentiometer 8.

Differential pressure transducer 1 and static pressure transducer 2 may be of the type set forth in application Serial No. 266,374, filed January 14, 1952, now Patent No. 2,751,576, in the names of David G. Soergel and Frederick H. Gardner for "Closed-Cycle Pressure Transducer." The closed-cycle transducer described herein operates on a normal force balance principle. This means that the output of the transducer is no longer dependent on the amount of displacement of the pressure sensitive element, but depends on a balancing of two forces to maintain the element in its balanced or zero position. One of these forces is produced in the pressure sensitive element by the input pressure. The other force is produced by a system of feedback from the output.

A null detector, which might be of the variable capacitor or inductive "E" pick-off type, is employed to detect any departure of the pressure sensitive element from its normal balanced position. When the element is unbalanced, a signal is sent from the null detector network to an amplifier circuit which actuates a torquing device, such as an electromagnetic torquer or motor. The torquing device moves, due to the amplifier output current, as long as the null detector indicates an unbalanced condition. Part of the output of the torquing device is fed back to the pressure sensitive element as a correcting factor. When the feedback is sufficient to restore the force balance, the torquing device ceases to move. The desired variation of the current, voltage, resistance inductance, or shaft rotation output is obtained from the output of the torquing device or is obtained from the output of the amplifier circuit, since the amplifier output current must be sufficient to maintain the required torque in the electro-magnetic torquing device or motor.

Figure 4:
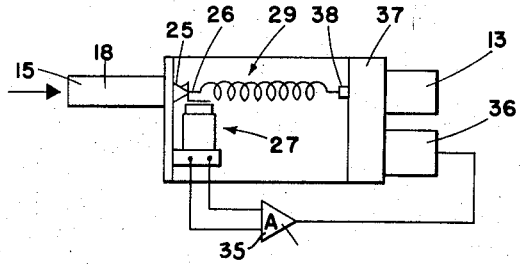
Fig. 4 is a schematic drawing of the device shown in Fig. 3.

Referring to Fig. 4 and to the sectioned view shown in Fig. 3, the desired output is a variation of resistance in potentiometers 13 and 14 which is proportional to the difference in the pressures supplied at fittings 15 and 16. Casing 17, Bourdon tube assembly 18, and plate assembly 19 enclose a pressure-sealed chamber consisting of interconnected chambers 20, 21, and 22. All external electrical connections to the transducer are made through terminals 23 of pressure-sealed socket 24. Fitting 16 is provided in plate assembly 19 to provide a port whereby any desired pressure is impressed in chambers 20, 21, and 22, and hence one side of Bourdon tube 25. Fitting 15 is attached to Bourdon tube assembly 18 to provide means for exerting input pressure to the other side of the Bourbon tube 25 or to evacuate that side if a static pressure input is desired.

Torsional straight line Bourdon tube 25 is sensitive to changes in the pressure differential between fittings 15 and 16. The movable or torque end of Bourdon tube 25 is rigidly connected to armature 26 of null detector 27. Feedback shaft 28 is also attached to armature 26. Torsional spring assembly 29, consisting of straightline torsional spring 30 secured to spring collars 31 and 32, transmits torque to feedback shaft 28 by means of shaft slots 33 and 34. Slot 33 permits axial motion of the torsional devices while transmitting all torque.

Normally the torque of torsional spring 29 is equal and opposed to the torque of Bourdon tube 25 and armature 26 is in a balanced or zero position. A change in the pressure differential upsets this balanced torque position. The unbalanced torque causes balanced armature 26 to rotate about the center line of Bourdon tube 25. Rotation of armature 26 unbalances the null detector 27. Null detector 27 is inductive "E" pick-off type consisting of a stator and armature 26. When unbalanced, the null detector 27 sends an error signal out through terminals 23 to power amplifier 35. In response to the error signal, power amplifier 35 furnishes power to motor 36. The direction of rotation of motor 36 depends on the phase of the detector error signal.

Motor 36 drives gear train 37. Output shafts of gear train 37 include the shafts of potentiometers 13 and 14. The shaft of either potentiometer 13 or 14 can be extended in length to drive any number of resistors or potentiometers. A further output shaft of gear train 37 is feedback drive shaft 38. Torsional spring collar 32 is secured to feedback drive shaft 38 by taper pin 39. Feedback drive shaft 38 is driven in such a direction as to cause torsional spring 30 to exert a torque on balanced armature 26, tending to return armature 26 to its zero balanced position.

As the forces tend toward balance, the null detector 27 output voltage decreases until a state of equilibrium is established wherein the residual voltage output of the null detector is just sufficient to maintain the required amplifier 35 current which produces the balancing torque required to maintain the state of equilibrium. Motor 36 ceases to run. The output shafts of potentiometers 13 and 14 being geared to motor 36 have turned through an angle which is proportional to change in pressure. Detail 40 is a spring stop device to prevent damage to the followup spring 30.

The device used in the example described above for obtaining shaft rotation proportional to pressure operates on the principle of maintaining zero deflection of the movable end of Bourdon tube 25. Only a small amount of deflection starts the feedback torque cancelling out the deflection. Thus, the amplitude of deflections is kept very small. Since the magnitude of the hysteresis error of the device depends on the amplitude of deflections from zero position, the hysteresis error is negligible.

In differential pressure transducer 1, ram pressure is introduced at fitting 15 and static pressure is introduced at fitting 16. In static pressure transducer 2, static pressure is introduced at fitting 16, and the chamber at which fitting 15 is attached is evacuated and sealed off. In each case the rotation of shaft 38 is a measure of the pressure differential between fittings 15 and 16.

Figure 5:
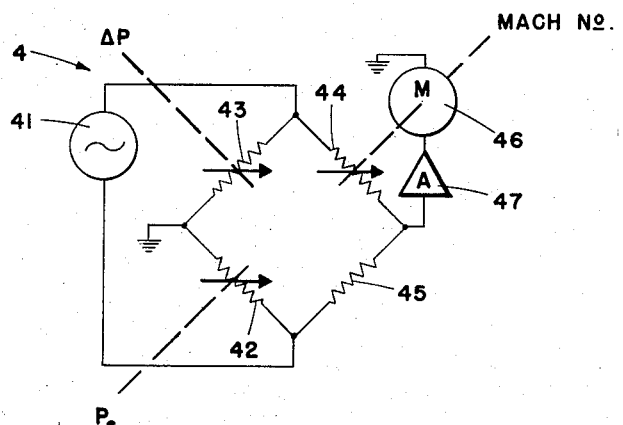
Fig. 5 is a schematic drawing of a typical Mach number computer.

Mach number computer 4 is shown in Fig. 5. Voltage from voltage source 41 is applied across a Wheatstone bridge comprising resistors 42, 43, 44, and 45. Variable resistor 42 is mechanically driven by static pressure transducer 2 so that the resistance of resistor 42 is proportional to the static pressure. Resistor 43 is driven by differential pressure transducer 1 so that the resistance of resistor 43 is proportional to the difference between ram and static pressure. Resistor 44 is a nonlinear variable resistor which is connected to be driven by motor 46. Motor 46 is driven by amplifier 47 which is connected across the output of the Wheatstone bridge of resistors 42, 43, 44, and 45. The nonlinearity of the resistance of resistor 44 is adjusted to null the bridge when the shaft rotation of motor 46 is proportional to the Mach number of the aircraft.

True airspeed computer 5 is shown in Fig. 6. Voltage source 48 is applied across the input of a Wheatstone bridge comprising resistors 49, 50, 51, and 52. The resistance of resistor 52 is proportional to the stagnation temperature of the air. Variable resistor 50 is mechanically driven by Mach number computer 4 so that the resistance of resistor 50 is a predetermined function of the Mach number. Amplifier 54 is connected across the output of the Wheatstone bridge of resistors 49, 50, 51 and 52 to drive motor 53 with a shaft rotation which is proportional to the true air speed. The nonlinear resistance of nonlinear resistor 49 is predetermined to cause the shaft rotation of motor 53 to be proportional to $V_T$.

The dynamic pressure of a flowing gas into a pitot tube is given by the expression $$q = \tfrac{1}{2}\rho V_T^2$$

wherein $q$ is the dynamic pressure, $\rho$ is the air density of free nonmoving air, and $V_T$ is the velocity with which the pitot tube is moving with respect to free air. $V_T$ may also be called the true air speed. Ordinarily with an incompressible fluid, the dynamic pressure $q$ would be equal to the difference between ram and static pressure measured by the pitot tube $\Delta P$. However, the dynamic pressure $q$ of a compressible fluid is increased by an amount commonly identified as the compressibility factor $f_c$. Hence, $$q = \tfrac{1}{2}\rho V_T^2 = \frac{\Delta P}{f_c}$$

By solving algebraically for $\rho$, $$\rho = \frac{2\Delta P}{f_c V_T^2}$$

and $$\frac{\rho}{\rho_0} = \frac{2\Delta P}{f_c V_T^2 \rho_0}$$

wherein $\rho_0$ is the density of air at some standard elevation, for example, sea level.

The compressibility factor $f_c$ is defined to be equal to $$1 + \frac{M^2}{4} + \frac{M^4}{40} + \frac{M^6}{1600} + \ldots$$

In Fig. 2 when the shaft of resistor 7 is rotated in proportion to the Mach number of the moving vehicle upon which it is mounted, the resistance across the terminals of resistor 7 is proportional to the compressibility factor $f_c$. Because the resistance across the terminals of resistor 7 is of the order of ten times the resistance across the fixed terminals of potentiometer 8 is moved linearly in proportion to the differential pressure $\Delta P$, the voltage upon the movable arm of potentiometer 8 is proportional to $$\frac{\Delta P}{f_c}$$

The output of amplifier 10 is fed back through potentiometer 11 and resistor 12 to its input. Potentiometer 11 is driven linearly in proportion to the true air speed of the vehicle upon which it is mounted to thereby divide the output of amplifier 10 by the square of the true air speed $V_T^2$. Hence, the output of amplifier 10 is a voltage proportional to $$\frac{\Delta P}{f_c V_T^2}$$

which in turn is proportional to $\rho$ and, by choice of appropriate constants is proportional to $$\frac{\rho}{\rho_0}$$

Thus, a new computer has been created for generating a voltage proportional to the ratio of the air density of static air surrounding a moving craft to the density of air at a predetermined standard such as the density of air at sea level.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for computing air density surrounding a moving vehicle comprising means for producing a signal proportional to the Mach number of said vehicle compressibility factor computer means responsive to the output of said Mach number means for computing the compressibility factor function of the Mach number of said vehicle; differential pressure computer means responsive to ram and static pressure input signals for computing the difference between ram and static pressure upon said vehicle; velocity computer means responsive to a stagnation temperature input signal and said Mach number producing means for computing the true velocity of said vehicle; and means responsive to said compressibility factor computer means, said differential pressure computer means, and said velocity computer means for dividing said differential pressure by said compressibility factor and by the square of said velocity.

2. Means for obtaining a voltage proportional to the ratio of the air density surrounding a moving vehicle to the density of air at sea level comprising Mach number computing means, including a shaft, for producing a shaft rotation proportional to the Mach number of said vehicle; transducer means, including a shaft, for producing a shaft rotation proportional to the difference between the ram and static air pressure measured upon said vehicle; electrical resistor means connected to be responsive to the rotation of the shaft of said Mach number computing means in accordance with the compressibility factor function of Mach number; electrical potentiometer means, including a voltage source conductively connected therewith attached to be driven by the shaft of said transducer, connected in series with said resistor means for generating a voltage proportional to said difference between ram and static pressure divided by said compressibility factor; velocity computer means, including a shaft, for producing a shaft rotation proportional to the true velocity of said vehicle; analog computer means connected between said velocity computer means and said potentiometer means to divide the voltage of said potentiometer means by the square of said velocity to thereby generate a voltage proportional to the air density surrounding said moving vehicle.

3. Means for obtaining a voltage proportional to the ratio of the air density surrounding a moving vehicle to the density of air at sea level comprising a first and second electrical potentiometer connected in series with a voltage source; means connected to drive said first potentiometer to cause the resistance thereof to be proportional to the compressibility factor; means connected to said second potentiometer to drive the arm thereof in proportion to the difference between ram and static pressure measured upon said vehicle to cause the voltage upon said arm to be proportional to the ratio of said difference in pressure to said compressibility factor; an amplifier connected by its input to the movable arm of said second potentiometer, a third potentiometer connected across the output of said amplifier, and means for driving the movable arm of said third potentiometer in proportion to the true velocity of said vehicle, said movable arm of said third potentiometer being connected to the input of said amplifier to thereby divide said ratio of difference in pressure to compressibility factor by the square of said true velocity to create an electrical voltage proportional to the ratio of the air density surrounding said vehicle to the density of air at sea level.

4. Means for obtaining a voltage proportional to the ratio of the air density surrounding a moving vehicle to the density of air at sea level comprising a variable resistor, shaft means connected to vary the resistance of said resistor, said variable resistor having its resistance distributed so that the total resistance thereof is a compressibility factor function of the rotation of said shaft means, means connected to said shaft means of said resistor to provide a rotation of said shaft means proportional to the Mach number of said vehicle, a first potentiometer having a shaft and a slider, and a voltage source connected in series with said resistor, means connected to rotate said shaft of said potentiometer by an amount proportional to the difference between ram and static pressure measured upon said vehicle, a feedback amplifier connected by its input through a summing resistor to said slider of said potentiometer, and means electrically connected between the output and input of said amplifier for providing feedback proportional to the square of the true velocity of said vehicle whereby the voltage at the output of said amplifier is proportional to the ratio of the air density surrounding said vehicle to a standard density of air at sea level.

5. Means for determining the density of undisturbed air in the vicinity of a vehicle moving rapidly through said air comprising a differential pressure transducer for producing a signal proportional to the difference between ram and static pressure, means responsive to the output of said differential pressure transducer for producing a signal proportional to the Mach number of said vehicle, means responsive to the output of said Mach number means for producing a signal proportional to the true airspeed of said vehicle, and means conductively connected to said differential pressure transducer, said Mach number means, and said true airspeed means for producing a signal proportional to the density of said undisturbed air.

6. Means for determining air density in the vicinity of an aircraft comprising differential pressure means for producing a signal proportional to the difference between static pressure and ram pressure input signals, means responsive to a static pressure input signal and the output of said differential pressure means for producing a signal proportional to the Mach number of said vehicle, means responsive to a stagnation temperature input signal and the output of said Mach number producing means for producing a signal proportional to the true airspeed of said vehicle, and means responsive to the outputs of said differential pressure means, said Mach number means, and said true airspeed means for producing a signal proportional to the density of air.

7. Means for computing air density in the vicinity of an aircraft comprising differential pressure computer means responsive to ram and static pressure input signals for computing the difference between ram and static pressure upon said aircraft, means responsive to the output of said differential means and to a static pressure input signal for computing the Mach number of said aircraft, means responsive to the output of said Mach number means and to a stagnation temperature input signal for computing the true velocity of said aircraft, means responsive to the output of said Mach number means for computing the compressibility factor function of said Mach number, means responsive to the output of said compressibility factor means and said differential pressure means for dividing said compressibility factor by said differential pressure, means responsive to the output of said true velocity means for computing the square of said velocity, and means responsive to the output of said dividing means and said velocity square means for dividing the output of said dividing means by the output of said velocity square means to produce a signal proportional to the air density of said aircraft.

References Cited in the file of this patent

UNITED STATES PATENTS

| | | |
|---|---|---|
| 1,449,437 | Obermaier | May 27, 1923 |
| 2,579,220 | Vine | Dec. 18, 1951 |
| 2,595,185 | Zauderer et al. | Apr. 29, 1952 |
| 2,714,309 | Redemske | Aug. 2, 1955 |
| 2,721,696 | Eisler et al. | Oct. 25, 1955 |

OTHER REFERENCES

Electronic Instruments (Greenwood, Holdam and Macrae), published by McGraw-Hill Book Co., New York, 1948, pages 55–56 relied on.